United States Patent [19]

Thoma et al.

[11] Patent Number: 4,594,385
[45] Date of Patent: Jun. 10, 1986

[54] COATING AGENTS OF POLYURETHANE DISPERSIONS AND THE USE THEREOF FOR TOP COATS AND FINISHES

[75] Inventors: Wilhelm Thoma, Leverkusen; Klaus Noll, Cologne; Klaus Nachtkamp, Cologne; Josef Pedain, Cologne; Walter Schröer, Leverkusen, all of Fed. Rep. of Germany

[73] Assignee: Bayer Aktiengesellschaft, Leverkusen, Fed. Rep. of Germany

[21] Appl. No.: 411,137

[22] Filed: Aug. 24, 1982

[30] Foreign Application Priority Data

Aug. 28, 1981 [DE] Fed. Rep. of Germany ....... 3134161

[51] Int. Cl.$^4$ ............................................. C08L 75/00
[52] U.S. Cl. .................................... 524/839; 524/840; 524/549
[58] Field of Search .................. 524/591, 839, 840

[56] References Cited

U.S. PATENT DOCUMENTS

| 3,262,805 | 7/1966 | Aoki | 117/11 |
| 3,770,681 | 11/1973 | Witt et al. | 260/29.2 TN |
| 4,017,493 | 4/1977 | Ferment et al. | 427/257 |
| 4,045,600 | 8/1977 | Williams | 427/379 |
| 4,108,814 | 8/1978 | Reiff et al. | 524/814 |
| 4,206,255 | 6/1980 | Wenzel et al. | 427/393.5 |
| 4,269,748 | 5/1981 | Nachtkamp et al. | 260/29.2 TN |

FOREIGN PATENT DOCUMENTS 1191260 5/1970 United Kingdom .

Primary Examiner—Paul R. Michl
Assistant Examiner—Alex H. Walker
Attorney, Agent, or Firm—Gene Harsh; Joseph C. Gil; Thomas W. Roy

[57] ABSTRACT

This invention relates to coating compositions based on aqueous polyurethane dispersions, as well as the use of the coating compositions for the production of top coats or finishes on flexible substrates, particularly on PVC. The present coating agents contain an aqueous polyurethane dispersion having certain physico-chemical properties and the following composition of the solid substance:

(A) from about 30 to 60%, by weight, of a hexane diol-1,6-polyester diol having a molecular weight of from about 500 to 6000;
(B) up to about 8%, by weight, of a relatively low molecular weight triol having a molecular weight of from about 91 to 399;
(C) from about 3 to 30%, by weight, of one or more mono- or poly-functional compounds bearing cationic and/or anionic groups and/or containing nonionic polyoxyethylene segments;
(D) from about 20 to 50%, by weight, of a diisocyanate corresponding to the following general formula:

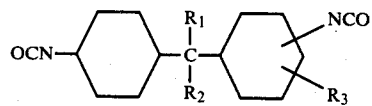

wherein $R_1$, $R_2$ and $R_3$, which may be the same or different, each represents hydrogen or a straight- or branched-chain aliphatic hydrocarbon radical containing from 1 to 4 carbon atoms;
(E) from about 2.5 to 20%, by weight, of other aliphatic and/or cycloaliphatic diisocyanates; and
(F) from about 0.5 to 4%, by weight, of hydrazine; and optionally conventional additives, auxiliaries and catalysts.

12 Claims, No Drawings

COATING AGENTS OF POLYURETHANE DISPERSIONS AND THE USE THEREOF FOR TOP COATS AND FINISHES

BACKGROUND OF THE INVENTION

1. Field of the Invention

This invention relates to coating compositions based on aqueous polyurethane dispersions and to the use thereof for the production of top coats or finishes on flexible substrates, in particular on PVC. The present coating agents comprise an aqueous polyurethane dispersion having certain physico-chemical properties.

2. Description of the Prior Art

The production of polyurethane coatings on PVC is known in principle. Thus, for example, U.S. Pat. Nos. 3,262,805; 4,017,493 and 4,045,600 describe processes for the coating of PVC using one- or two-component polyurethane systems dissolved in organic solvents.

The use of solvent-containing coating agents is accompanied by numerous problems, however, and for economical and, in particular, ecological reasons, it is necessary to restrict as far as possible or even to avoid completely the use of organic solvents. It is known from German Offenlegungsschrift No. 1,769,387 (British Pat. No. 1,191,260) to cement PVC with aqueous polyurethane dispersions. However, the aqueous polyurethane dispersions could not be used as a top coat or finish on PVC as it has not been possible hitherto to provide products having, on the one hand, good adhesion to PVC and, on the other hand, the high level of quality demanded in the coatings industry for top coats and finishes (high softening point; high mechanical strength; stability to hydrolysis and ageing; minimal swelling in plasticizers; blocking action against the migration of the plasticizers contained in the PVC; avoidance of discoloration at the gelation temperatures of PVC pastes; and pleasant dry feel).

The coating agents described in German Offenlegungsschrift No. 2,807,479 made it possible for the first time to provide aqueous polyurethane dispersions which almost met the above requirements and allowed the production of coatings on PVC, in particular on foamed PVC, without the use of solvents.

However, these coating agents still have some disadvantages which make them difficult to use:

The flex resistance of the final composite material is often inadequate and the adhesion to the PVC is unsatisfactory.

In particular, however, the fact that the coating agents are composed of mixtures of two polyurethane dispersions is a considerable disadvantage. Such mixtures are invariably expensive and complicated to produce and may give rise to errors. Moreover, the compatibility of the two systems must be guaranteed.

It has now been found that the disadvantages of the system according to German Offenlegungsschrift No. 2,807,479 may be overcome and that it is still possible, with uniform polyurethane dispersions, to produce coatings on PVC which have an exceptional level of quality if a dispersion of a certain composition is used. This is all the more surprising since it is quite impossible with the individual dispersion components according to German Offenlegungsschrift No. 2,807,470 to produce coatings or finishes on foamed or non-foamed PVC which meet the essential requirements as regards quality.

SUMMARY OF THE INVENTION

The present invention relates to coating agents based on the aqueous, polyurethane dispersions containing a solid composed of essentially linear polyester diols, diisocyanates, compounds which contain hydrophilic groups and are mono- and/or di-functional towards isocyanates, as well as optionally relatively low molecular weight trifunctional components and difunctional chain-extenders, as well as optionally conventional additives, auxiliaries and catalysts, characterized in that the solid substance is composed of:

(A) from about 30 to 60%, by weight, preferably from about 35 to 50%, by weight, of a hexane diol-1,6-polyester having a molecular weight of from about 500 to 6000, preferably from about 500 to 3000;

(B) up to about 8%, by weight, preferably from about 0.5 to 5%, by weight, of a relatively low molecular weight triol having a molecular weight of from about 92 to 399;

(C) from about 3 to 30%, by weight, preferably from about 5 to 20%, by weight, of one or more mono- or poly-functional compounds containing cationic and/or anionic groups and/or non-ionic polyoxyethylene segments;

(D) from about 20 to 50%, by weight, preferably from about 25 to 40%, by weight, of a diisocyanate corresponding to the following general formula:

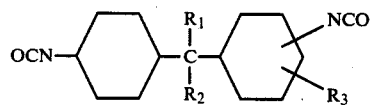

wherein $R_1$, $R_2$ and $R_3$, which may be the same or different, each represents hydrogen or a straight- or branched-chain aliphatic hydrocarbon radical containing from 1 to 4 carbon atoms;

(E) from about 2.5 to 20%, by weight, preferably from about 4 to 18%, by weight, of other aliphatic or cycloaliphatic diisocyanates; and (F) from about 0.5 to 4%, by weight, preferably from about 0.8 to 3%, by weight, of hydrazine.

DETAILED DESCRIPTION OF THE INVENTION

The hexane diol-1,6-polyesters (A) to be used according to the present invention preferably contain as acid component aliphatic dicarboxylic acids, for example succinic acid, suberic acid, acelaic acid, sebacic acid, hexahydrophthalic acid anhydride, endomethylene tetrahydrophthalic-acid anhydride, glutaric acid anhydride, maleic acid, fumaric acid, and preferably adipic acid. In addition, carbonic acid is also preferred, but it is obviously possible to use derivatives of carbonic acid, such as diesters, for example, diphenyl carbonate and diethyl carbonate, or also phosgene, for the preparation of the polyesters.

The use of aromatic dicarboxylic acid, such as phthalic acid, isophthalic acid and terephthalic acid, is less preferred. In addition to hexane diol-1,6, it is also possible, in a less preferred embodiment, to use amounts of other diols, for example, butane diol-1,4, diethylene glycol or HO—(CH$_2$)$_6$—O—CO—(CH$_2$)$_5$—OH, but the content thereof should not exceed approximately 20 mol %. The molecular weight of the hexane diol-1,6- polyesters (A) should be from about 500 to 6000, preferably from about 500 to 3000.

The lower molecular weight triols (B) include, in particular, glycerin, trimethylol propane, trimethylol ethane and the various isomeric hexane triols, as well as 1,3,5-tris-hydroxy-cyclohexane. The lower alkoxylation products thereof are also suitable. The molecular weights should preferably be from about 92 to 399.

Suitable hydrophilic compounds (C) include structural components of the type exemplified in the literature concerning the production of aqueous polyurethane dispersions and solutions, which are mono- or difunctional, in particular difunctional, in the context of the isocyanate addition reactions and which contain cationic and/or anionic hydrophilic groups and/or non-ionic hydrophilic polyoxyethylene isocyanates. These are, for example, dihydroxy compounds; diamines or diisocyantes containing ionic or potential ionic groups (for example tertiary amine groups which become ammonium groups when they are acidified or alkylated), or also monoalcohols, monoamines or monoisocyanates containing polyethylene oxide units.

The preferred hydrophilically modified structural components (C) include, in particular, the aliphatic diols containing sulphonate groups according to German Offenlegungsschrift No. 2,446,440 corresponding to the following general formula:

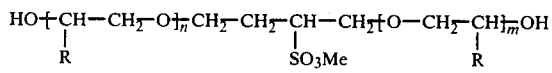

wherein
R represents hydrogen or an organic radical containing from 1 to 8 carbon atoms;
n and m are integers of from 1 to 10; and
Me represents a quaternized ammonium ion or an alkali metal cation (propoxylated addition product of sodium bisulphite to butene diol-1,4);
the cationic or anionic incorporable internal emulsifiers according to German Offenlegungsschrift No. 2 651 506 or diamino sulphonates corresponding to the following formula:

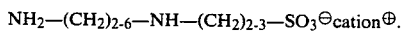

The monofunctional, incorporable hydrophilic polyethers described in German Offenlegungsschrift No. 2651 501, which preferably have a molecular weight of from about 200 to 3000 and a polyoxyethylene content of from about 60 to 95%. by weight, are also preferred.

The ammonium or alkali metal salts of organic dihydroxymonocarboxylic acids, for example the salt of 2,2-dimethylol propionic acid, are a type of preferred, incorporable ionic compounds.

The dicyclohexyl alkane diisocyanates (D) to be used according to the present invention corresponding to the following general formula:

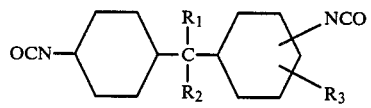

wherein $R_1$, $R_2$ and $R_3$ represent H or $C_1$-$C_4$ straight- or branched-chain alkyl radicals; include the isomers (for example, 2,2'-, 2,4'- and 4,4'-isomers) and the cis/trans, cis/cis and trans/trans conformers of diisocyanato dicyclohexyl methane. However, the representatives of the corresponding ethylidene, propylidene, butylidene compounds, as well as other homologues are also included, for example 4,4'-diisocyanato dicyclohexyl dimethylmethane. Diisocyanates wherein $R_3$ does not represent hydrogen, but a monovalent hydrocarbon, for example methyl, ethyl, propyl, isopropyl, butyl, isobutyl or t-butyl, are less preferred.

The diisocyanates (E) which are to be used proportionally but do not correspond to the above formula include tetramethylene diisocyanate, xylylene dissocyanate, as well as the perhydrated derivative thereof, cyclohexylene diisocyanate-1,3 and 1,4, as well as, particularly preferably, 3-isocyanatomethyl-3,5,5-trimethyl-cyclohexylisocyanate and hexamethylene-1,6-diisocyanate.

Other diisocyanates to be used include lysine methyl ester diisocyanate, 2,4- and/or 2,6-hexahydro toluylene diisocyanate, 1,9-diisocyanato-5-methyl nonane, 1,8-diisocyanato-2,4-dimethyl octane. The cycloaliphatic diisocyanates may be used as mixtures of the positional isomers thereof as well as stereo isomers (conformers).

The hydrazine (F) is preferably used in the form of its ketazines (reaction products with, for example, acetone or other ketones, such as methylethyl ketone) or optionally also in the form of its carbonic acid salts. Additives and auxiliaries, as well as catalysts, which are conventional in polyurethane chemistry may be added in the conventional manner and quantity. They are listed, for example, in German Auslegeschrift No. 2,854,384.

Processes for the production of stable aqueous polyurethane dispersions which are suitable according to the present invention are described, for example, in German Auslegeschrift Nos. 1,178,586 (U.S. Pat. No. 3,480,592), 1,495,745 (U.S. Pat. No. 3,479,310) and 1,770,068 (U.S. Pat. No. 3,756,992), German Offenlegungsschrift Nos. 2,314,512 (U.S. Pat. No. 3,905,929), 2,314,513 (U.S. Pat. No. 3,920,598), 2,320,719 (British Pat. No. 1,465,572), 2,446,440; 2,555,534 and 2,811,148 and also in "Angewandte Chemie" 82, 53 (1970) by D. Dieterich. The general principle of this process involves incorporating hydrophilic centers as so-called "internal emulsifiers" into the chain of a polyurethane or polyurethane urea macro-molecule. Anionic or cationic groups and/or —$CH_2$—$CH_2$—O— sequences may be used as hydrophilic centers in this sense.

In order to produce polyurethane dispersions, an NCO prepolymer having terminal NCO groups is generally produced first from a relatively high molecular weight hexane diol polyester diol, a relatively low molecular weight triol and an excess of polyisocyanate, and is then converted by chain-extension, for example as in the processes in German Auslegeschrift No. 1,495,745 (U.S. Pat. No. 3,479,310), German Offenlegungsschrift Nos. 1,770,068 (U.S. Pat. No. 3,756,992), 2,446,440 and 2,811,148 into a polyurethane dispersion. The relatively high molecular weight polyhydroxyl compound and the optional relatively low molecular weight alcohol may contain ionic groups or groupings which may be converted to ionic groups, of the type listed, for example, in German Offenlegungsschrift Nos. 1,770,068 and 2,446,440. However, it is also possible, in addition to or instead of the ionically modified high and low molecular weight alcohol to incorporate into the macro-molecule monohydric alcohols or diols having ethylene oxide sequences as hydrophilic segments, as described, for example, in German Offenlegungsschrift Nos. 2,314,512 (U.S. Pat. No. 3,905,929); 2,551,094; 2,555,534 and 2,651,506. In principle, however, it is also possible to produce hydrophobic prepolymers (i.e. those without hydrophilic centers) and then to convert them by chain-extension, for example with diamines or diols containing ionic groups (German Offenlegungsschrift No. 2,035,732) into polyurethanes or polyurethane ureas which are dispersible in water.

During the production of the NCO prepolymers, the reactants are generally used in proportions corresponding to a ratio of isocyanate groups to isocyanate-reactive hydrogen atoms, preferably hydroxyl groups, of from about 1.1:1 to 10:1, preferably from about 1.3:1 to 3:1.

The NCO prepolymers are preferably produced in the melt at from about 30° to 190° C., preferably from about 50° to 120° C. The prepolymers may obviously also be produced in the presence of organic solvents. Suitable solvents which may be used, for example, for lowering the viscosity of particularly highly viscous NCO prepolymers include, for example, acetone, methylethyl ketone, ethyl acetate, cyclohexanone, toluene, optionally also dimethyl formamide or N-methylpyrrolidone.

The quantity of solvent may be calculated in such a way that the chain-extension of the NCO prepolymers with hydrazine and optionally hydrophilic components may be carried out in the solvent and the resulting solution is of sufficiently low viscosity to be converted into a dispersion with water. In this process, it is advisable to use a solvent having a boiling point far below that of water so as to simplify removal by distillation.

However, the dispersions according to the present invention are preferably produced by the process described in German Offenlegungsschrift No. 2,811,148. The NCO prepolymer is mixed with an azine and may be converted into a dispersion with water without the use of a solvent. Chain-extension takes place in the heterogeneous phase as the chain-extender hydrazine is liberated slowly from the azine by water. Solvents may also be used in this process, but they are usually only added to the prepolymer in small quantities, optionally to reduce the viscosity thereof or as a coalescing agent. In this case, it is even preferable to use high-boiling solvents.

The solid substances in the dispersion contain from about 5 to 50, preferably from about 10 to 30, (pseudo-) milliequivalents of hydrophilic groups per 100 g of solid material. A "pseudomilliequivalent" is the quantity of ethylene oxide units in the polyurethane, preferably in a polyether chain which is lateral to the main chain of the polyurethane molecule, whose hydrophilizing properties correspond to one milliequivalent of ionic groups. By definition, 0.5% by weight, of —CH$_2$—CH$_2$—O— units should correspond to one "pseudomilliequivalent percent".

The compositions according to the present invention contain the emuslifiers needed for the dispersion thereof in water in the form of incorporated hydrophilic groups of the type described above. While the addition of known external emulsifiers is obviously also possible, it is not preferred. However, if external emulsifiers are used, the content of incorporated emulsifier may be reduced.

The dispersions generally have a solids content of from about 20 to 60%, by weight, preferably from about 35 to 50%, by weight. The diameters of the particles in the dispersion may vary from about 20 nm to 1 μm, but should generally be from about 50 and 200 nm.

The aqueous PUR dispersions according to the present invention may be mixed with aqueous non-PUR dispersions and aqueous solutions of other polymers, for example with dispersions of vinyl and/or diene polymers composed of vinyl chloride, vinylidene chloride, vinyl acetate, vinyl alcohol, styrene, (meth)acrylic acid ester, butadiene, isoprene, chloroprene; solutions of polyvinyl alcohol, polyacrylamide, polyvinyl pyrrolidone, starch, gelatines, casein; aqueous dispersions of nitrocellulose, etc.

The known agents for improving the feel as well as pigments, flow agents, thickeners and other auxiliaries may obviously also be added to the present coating compositions. They may optionally also contain solvents, such as alcohols, amides or ketones (in quantities of preferably less than about 10%, by weight, based on aqueous dispersion composition).

The coating agents according to the present invention are suitable, in particular, as top coats or finishes in the coating of textiles with PVC. Three different possible methods of applying the present compositions are to be described below as examples:

1. The dispersion composition according to the present invention is applied, for example, by spreading, spraying or printing, to a solid, optionally textured or embossed, PVC film. The coating is generally dried at from about 70° to 190° C. for from about 20 to 200 seconds in a heating duct. Next, the synthetic leather material obtained in this way is optionally embossed mechanically and then rolled.

2. The polyurethane dispersion composition is spread onto a sheet of release paper or another support material (for example a steel strip) and dried in a heating duct. A degassed PVC paste is applied to the dried PUR film using a doctor blade. The textile to be coated is applied onto the PVC paste. The PVC is caused to gel in a known manner in a heating duct. After cooling, the sheet of release paper or the other support material is removed and the synthetic leather rolled.

3. The composition according to the present invention is spread on a sheet of release paper or another support material, such as a steel strip and is dried in the heating duct. A PVC paste containing chemical blowing agents, such as azoisobutyric acid dinitrile and azodicarbonamide, is spread onto the dried PUR film (cf., also, F. Lober. Angw. Chem. 64, 65 (1952); R. Reed, Plastics Progress 1955, 51; H. A. Scheurlen, Kunststoffe 47, 446 (1957)). A textile is inserted onto the PVC paste and then guided into a heating duct. The desired PVC foam is produced during the gelation process. After cooling the material to a temperature which is generally below 80° C., the support material is removed and the resulting synthetic leather is rolled.

While process (1) represents direct coating of the composite PVC textile material with a polyurethane dispersion composition, processes (2) and (3) are so-called "reverse coatings". The thickness of the polyurethane top coat is from about about 5 to 100 g/m$^2$, preferably from about 8 to 25 g/m$^2$, in all cases.

During the gelation of PVC pastes, temperatures of from about about 170° to 200° C. are generally applied. The melting point of a top coat on PVC should therefore be above 200° C. PVC is a plastic which is extremely stable to hydrolysis. For this reason, the finish should also be as stable as possible to hydrolysis so that it is not decomposed before the PVC. It should be noted, that, in the course of time, PVC gives off small quantities of hydrochloric acid which have a detrimental effect on the stability of the top coat to hydrolysis. In addition, the metal salts (generally lead, cadmium or zinc compounds) used in the PVC to reduce the gelation temperature and as stabilizers may impair the stability to hydrolysis.

Furthermore, a small degree of swelling by the conventional commercial plasticizers for PVC is an important criterion for a good PUR top coat. It depends greatly on the type of plasticizer (generally esters of phthalic acid, adipic acid, phosphoric acid or alkyl sulphonic acids with α-ethyl hexanol, n-butanol, benzyl alcohol, phenol and/or cresol). Little swelling of the top coat material by the plasticizer for PVC is, moreover, necessary for producing good adhesion on flexible PVC and for achieving increased flexibility in the PUR surface layer. However, to prevent excessive migration of plasticizers to the surface, the swelling of the finish should be as slight as possible.

All these criteria are surprisingly fulfilled in an optimum manner by the coating systems according to the present invention.

The coating produced according to the present invention may obviously be embossed at any time. Thus, the coated textile may be embossed directly after the drying or gelation process, but optionally also after the coating has been stored for a relatively short or even prolonged period. With the reverse process, a suitable surface texture may be achieved during the production of the coating by the use of a sheet of embossed release paper or another support material.

The following Examples illustrate the present invention. Unless otherwise indicated, details of quantities should be interpreted as parts, by weight, or percentages, by weight.

EXAMPLE 1

1.1 Production of the PUR dispersion

Mixture 554 g hexane diol-1,6-polyadipate (OH-No. 134)
23.0 g trimethylol propane
53.0 g dimethylol propionic acid
33.0 g triethylamine
200 g 1,6-hexane diisocyanate
310 g 4,4'-dicyclohexyl methane diisocyanate
69.5 g acetone azine
1860 g deionized water Preparation: (according to German Offenlegungsschrift No. 2,811,148)

The trimethylol propane, the dimethylol propionic acid and the triethylamine are mixed with the hexane diol polyadipate dehydrated at 120° C., and the diisocyanates are added at 60° C. The mixture is stirred at 80° C. until a constant NCO value is reached. The mixture is then allowed to cool to 50° C. and the acetone azine is stirred into the moderately viscous NCO prepolymer melt, while the temperature drops slightly and the viscosity continues to decrease. The water is now added with thorough stirring and the mixture is stirred for a further two hours.

The dispersion formed has a solids content of 40% and a Ford cup viscosity (4 mm nozzle) of 16 seconds and a pH of 7.5. The solid contains 32 milliequivalent percent of carboxyl groups.

Properties of film

Softening range: 200° C.
Shore A hardness: 92
100% modulus: 17 MPa

1.2 Production of a top coat for foamed PVC

The dispersion described under 1.1 is applied together with a polyacrylic acid thickener onto a sheet of commercial release paper (for example Transkote VEM CIS manufactured by S. D. Warren) using a roller spreader incorporating a doctor blade in such a way that a film of 10 g/m$^2$ is formed after drying at from 80° to 150° C.

Spreading paste 100 parts, by weight, 40% PUR dispersion from Example 1.1
1 part, by weight, polyacrylic acid thickener (Mirox AM, Fa. Stockhausen, D-Krefeld).
5 parts by weight, aqueous pigment preparation (Helioecht-Gelb-Feinteig; Bayer AG, D-5090 Leverkusen); the mixture is then adjusted to pH 8 using ammonia.

A PVC blowing foam mixture of the following type is applied to the dried PUR film:

55 parts, by weight, of a PVC paste (for example ®Solvic 336)
9 parts, by weight, of dioctylphthalate plasticizer
36 parts, by weight, of didecylphthalate plasticizer
10 parts, by weight, chalk
1 part, by weight, SiO$_2$ powder
1 part, by weight, azoisobutyric acid dinitrile
1 part, by weight, Cd/Zn stearate
5 parts, by weight, iron oxide yellow pigment.

The PVC foam paste is laminated in a quantity of 200 g/m$^2$ with a cotton fabric and is thoroughly heated for 1.5 minutes at 190° C. The fabric is then cooled and separated from the paper.

The thus-obtained coated article is characterized by a dry surface feel and high flex resistance; the PUR film adheres very well to the PVC foamed coat.

The lacquer acts as a good barrier against the entry of the plasticizers into the foam as it only swells slightly in them. The pigmented top coat does not change color at high temperatures as the PUR film forming the basis thereof does not discolor at the gelation temperature of the PVC foam.

EXAMPLE 2

2.1 Production of the PUR dispersion

Mixture 485 g hexane diol-1,6-polyadipate (OH No. 134)
20 g trimethylol propane
85 g propoxylated adduct of 2-butene diol-1,4 and NaHSO$_3$ (molecular weight 425)
365 g 4,4'-dicyclohexylmethane diisocyanate
67 g 1,6-hexane diisocyanate
50 g actone azine
107 g N-methyl pyrrolidone
1500 g deionized water Preparation: (see Example 1.1; cf. German Offenlegungsschrift No. 2,811,148).

The thus-obtained dispersion has a solids content of 40%, a Ford cup viscosity (4 mm nozzle) of 19 seconds and a pH of 6.8. The solid contains 19 milliequivalent percent of SO$_3^{(-)}$ groups.

A film produced from the dispersion has a Shore A hardness of 94, a 100% modulus of 20 MPa, and the film softens above 200° C.

2.2 Production of a top coat for foamed PVC

Spreading paste 100 parts 40% PUR dispersion 2.1
2.0 parts polyacrylic acid thickener (see example 1)
10 parts aqueous pigment preparation adjusted to pH 8 using ammonia (see example 1)

The PUR/PVC coated article produced according to Example 1.2 has a very dry feel, a very good flex resistance and excellent adhesion to the PVC foam.

The top coat acts as a good barrier against the entry of the plasticizers contained into the foam, as it only swells slightly in them. The pigmented top coat does not change color at high temperatures as the PUR film on which it is based does not discolor at the gelation temperature of the PVC foam.

EXAMPLE 3

3.1 Production of the PUR dispersion

Mixture 650 g 1,6-hexane diol polycarbonate (OH No. 112)
13.4 g trimethylol propane
85 g propoxylated adduct of 2-butenediol-1,4 and NaHSO$_3$ (molecular weight 425)
315 g 4,4'-dicyclohexyl methane diisocyanate
44.4 g isophorone diisocyanate
33.6 g 1,6-hexane diisocyanate
52.8 g acetone azine
1780 g deionized water Preparation: (see Example 1.1, cf. German Offenlegungsschrift No. 2,811,148)

The thus-obtained dispersion has a solids content of 40%, a Ford viscosimeter viscosity (4 mm nozzle) equivalent to 20 seconds and a pH of 7.5. The solid material contains 17 milliequivalent percent of SO$_3^{(-)}$ groups.

The film produced from the dispersion has a Shore A hardness of 92, a 100% modulus of 16 MPa and the film softens above 200° C.

3.2 Production of a top coat or finish on PVC

Spreading paste 100 parts 40% PUR dispersion 3.1
1.0 parts polyacrylic acid thickener (see example 1)
15 parts aqueous pigment preparation adjusted to pH 8 using ammonia (see example 1)

The PUR/PVC coated article produced according to Example 1.2 has a very dry feel, good flex resistance and very good adhesion to the PVC foam.

The top coat acts as a good barrier against the entry of the plasticizers contained in the foam as it only swells slightly in them. The pigmented top coat does not change color at high temperatures as the PUR film on which it is based does not discolor at the gelation temperature of the PVC foam.

What is claimed is:

1. A coating agent based on an aqueous, polyurethane dispersion containing a solid substance comprising, based on the weight of the solid substance,
(A) from about 30 to 60%, by weight, of a polyester diol having a molecular weight of from about 500 to 6000 and wherein the diol component comprises at least about 80 mol % of hexane diol-1,6;
(B) from about 0.5 to 5.0%, by weight, of a relatively low molecular weight triol having a molecular weight of from about 92 to 399;
(C) from about 3 to 30%, by weight, of at least one mono- or poly-functional compound within the context of the isocyanate-polyaddition reaction bearing anionic groups and/or containing non-ionic polyoxyethylene segments;
(D) from about 20 to 50%, by weight, of a diisocyanate corresponding to the following general formula:

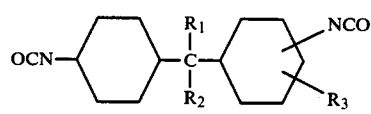

wherein R$_1$, R$_2$ and R$_3$, which may be the same or different, each represents hydrogen or a straight- or branched-chain aliphatic hydrocarbon radical containing from 1 to 4 carbon atoms;
(E) from about 2.5 to 20%, by weight, of other aliphatic and/or cycloaliphatic diisocyanates; and
(F) from about 0.5 to 4%, by weight, of hydrazine.

2. The coating agent according to claim 1 wherein the polyester diol component (A) is a hexane diol-1,6-polyadipate and/or hexane diol-1,6-polycarbonate.

3. The coating agent according to claim 1 or 2 wherein the lower molecular weight triol (B) is glycerin and/or trimethylol propane.

4. The coating agent according to claim 1 or 2 wherein component (C) is a non-ionic mono-functional polyether having a molecular weight of from about 500 to 3000 and a polyoxyethylene content of from about 60 to 95%, by weight.

5. The coating agent according to claim 1 or 2 wherein component (C) corresponds to the following general formula:

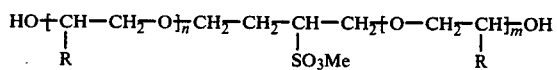

wherein
R represents hydrogen or an organic radical having from 1 to 8 hydrocarbon atoms;
m and n represent integers of from 1 to 10; and
Me is a quaternized ammonium ion or an alkali metal cation.

6. The coating agent according to claim 1 or 2 wherein component (C) is an ammonium and or alkali metal salt of an organic dihydroxy carboxylic acid.

7. The coating agent according to claim 1 or 2 wherein in the compound corresponding to the following general formula:

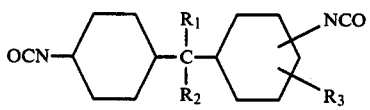

R$_1$, R$_2$ and R$_3$ represent hydrogen atoms.

8. The coating agent according to claim 1 or 2 wherein the diisocyanate (E) is 3-isocyanatomethyl- 3,5,5-trimethyl cyclohexylisocyanate and/or 1,6-diisocyanatohexane.

9. A coating agent based on an aqueous, polyurethane dispersion containing a solid substance comprising, based on the weight of the solid substance,
(A) from about 30 to 60%, by weight, of a polyester diol having a molecular weight of from about 500 to 6000 and selected from the group consisting of hexane diol-1,6-polyadipate, hexane diol-1,6-polycarbonate and mixtures thereof;
(B) from about 0.5 to 5.0%, by weight, of glycerin and/or trimethylol propane;
(C) from about 3 to 30%, by weight, of at least one mono- or poly-functional compound within the context of the isocyanate-polyaddition reaction bearing anionic and/or non-ionic polyoxyethylene segments;
(D) from about 20 to 50%, by weight, of a diisocyanate corresponding to the following general formula:

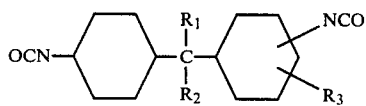

wherein $R_1$, $R_2$ and $R_3$, represents hydrogen atoms;

(E) from about 2.5 to 20%, by weight, of 3-isocyanatomethyl-3,5,5 trimethyl cyclohexylisocyanate and/or 1,6-diisocyanatohexane; and
(F) from about 0.5 to 4%, by weight, of hydrazine.

10. The coating agent according to claim 9 wherein component (C) is a non-ionic mono-functional polyether having a molecular weight of from about 500 to 3000 and a polyoxyethylene content of from about 60 to 95%, by weight.

11. The coating agent according to claim 9 wherein component (C) corresponds to the following general formula:

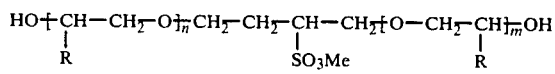

wherein
R represents hydrogen or an organic radical having from 1 to 8 hydrocarbon atoms;
m and n represent integers of from 1 to 10; and
Me is a quaternized ammonium ion or an alkali metal cation.

12. The coating agent according to claim 9 wherein component (C) is an ammonium and/or alkali metal salt of an organic dihydroxy carboxylic acid.

* * * * *